United States Patent
Kerklaan et al.

[11] Patent Number: 5,808,769
[45] Date of Patent: Sep. 15, 1998

[54] COMBINATION DIFFUSED AND DIRECTED INFRARED TRANSCEIVER

[75] Inventors: Albert J. Kerklaan; Gerald R. Drennan, both of Scarborough; Ravi S. Ananth, Ancaster; Michael J. Preyde, Oshawa, all of Canada

[73] Assignee: International Business Machines Corporation, Armonk, N.Y.

[21] Appl. No.: 717,519

[22] Filed: Sep. 23, 1996

[30] Foreign Application Priority Data

Dec. 29, 1995 [CA] Canada ................................ 2166334

[51] Int. Cl.⁶ .......................... H04B 10/04; H04B 10/10; H04B 10/105
[52] U.S. Cl. .......................... 359/180; 359/152; 359/159; 359/172
[58] Field of Search ..................... 359/113, 114, 359/152, 153, 159, 172, 180, 641, 827

[56] References Cited

U.S. PATENT DOCUMENTS 5,377,000  12/1994  Berends .......................... 356/73

FOREIGN PATENT DOCUMENTS

| | | | |
|---|---|---|---|
| 400176 | 12/1990 | European Pat. Off. | 359/159 |
| 95741 | 6/1984 | Japan | 359/159 |
| 71342 | 4/1987 | Japan | 359/159 |
| 84329 | 4/1988 | Japan | 359/159 |
| 3296331 | 12/1991 | Japan | 359/142 |
| 6132901 | 5/1994 | Japan | 359/142 |
| 9003072 | 3/1990 | WIPO | 359/159 |

*Primary Examiner*—Leslie Pascal
*Attorney, Agent, or Firm*—John D. Flynn

[57] ABSTRACT

An infrared transceiver for use with a computer in a wireless Local Area Network. The transceiver comprises a light emitting diode array and photodiodes. The transceiver is operable in a diffused beam arrangement and a directed beam arrangement. The transceiver is converted to directed beam operation by attaching a user installable collimator. The collimator redirects the beams into parallel beams, and the direction of the parallel beams is controlled through an adjustable tilt stand. The collimator is detachable for converting back to diffused beam operation.

16 Claims, 4 Drawing Sheets

COMBINATION DIFFUSED AND DIRECTED INFRARED TRANSCEIVER

FIELD OF THE INVENTION

The present invention relates to wireless communication systems, and more particularly to a convertible transceiver for use in an infrared communication network.

BACKGROUND OF THE INVENTION

Local area networks (LANs) are prevalent in computing, and the connection of computers in a LAN provides a convenient vehicle for distributed processing and efficient allocation of resources, such as servers, printers, scanners, and gateway communication devices. In the office environment, LANs typically comprise wired interconnections between stations or computers. Wired LANs have the disadvantage that extensive cabling is required to interconnect the stations in the network. The installation of such cabling is generally inconvenient and gives rise to inflexibility if it is desired to alter the physical locations of the stations comprising the network.

To overcome the disadvantages of wired LANs, it has been proposed to utilize a wireless transmission link to replace the cabling connections of a wired LAN. Wireless communication between two points is well known and two approaches have emerged as solutions for wireless LANs. One solution uses radio frequency (RF) communication techniques to implement the communication channels. The other solution utilizes infrared (IR) radiation as a communication medium. Infrared based systems have found widespread appeal, particularly in an indoor environment, such as an office building. Infrared based systems have the additional advantage of not requiring compliance with the more stringent government regulations applied to RF based systems, for example, as would be required for a system utilizing microwave frequency signals.

Communication interconnections in a wireless LAN utilizing infrared are set up using infrared transceivers. A station, e.g. personal computer (PC), is connected to a transceiver. The transceiver has an infrared transmitter and an infrared receiver. The infrared transmitter includes at least one infrared light emitting diode (LED), and typically comprises an array of infrared LEDs. The infrared receiver comprises one or more photodiodes responsive to the output wavelength spectrum of the LED in the transceiver of the communication station on the LAN.

In the art, infrared-based transceivers fall into two general classes: diffused IR transceivers and directed beam IR transceivers. Diffused IR transceivers typically comprise an array of LEDs which disperse infrared beams throughout an office space. The infrared beams are picked up by the receivers of transceivers on stations located throughout the office. Diffused IR transceivers permit a data processing station, i.e. computer, to talk with a number of other stations located in the office space. In directed beam IR transceivers, the infrared beam is directed towards the transceiver of the station intended for communication. In other words, there is a line of sight path between two stations and the infrared beam is directed along this line of sight path. Direct beam IR transceivers are commonly referred to as "point and shoot" or "serial IR" systems, and find widespread use in establishing a communication link between a computer and peripheral device, for example, a notebook computer and a laser printer.

The performance and integrity of an infrared communication link will depend on the operating environment, particularly the ambient light and the reflectivity of the interior surfaces. Infrared systems tend to provide better performance in an office space where the ambient light level is not very high, especially, in systems where the carrier beam is not high frequency modulated. The reflectivity of the interior surfaces of an office space will also affect transmission of infrared beams. Surfaces having a tendency to absorb infrared beams will degrade the performance of an infrared communication system, and in particular a system comprising diffused beam devices. It is possible to lessen the effects of the operating environment using set-up techniques for the infrared transceivers and adjustments to the orientations of the beam paths.

In many applications, the most efficient arrangement, i.e. diffused transmission and directed beam transmission, is not known until the wireless system is installed and tested. This means that the design choice to use a diffused transmission type transceiver may be prove to be less than optimal when the system is installed in the working environment. Similarly, changes to the working space or reconfiguration of the wireless network may necessitate switching from a diffused transceiver to a directed beam transceiver.

BRIEF SUMMARY OF THE INVENTION

The present invention provides a diffused beam infrared transceiver which is convertible to a directed beam transceiver by means of a collimator.

According to the present invention, the collimator is installable by the end user. With the collimator installed, the diffused infrared beams are directed into parallel beams and the transceiver is suitable for "point and shoot" transmission. The transceiver includes a tilt stand enabling the end user to point the redirected parallel beams in a direction of their choice.

In a first aspect, the present invention provides a transceiver for providing a wireless communication interface for a computer, said transceiver comprising; a housing; a substrate for receiving a plurality of light emitting diodes, said substrate being mounted inside said housing and including external electrical connection means for connecting to the computer; aperture means in said housing for passing light beams emitted by said light emitting diodes; collimator means for redirecting beams emitted from said light emitting diodes into parallel beams for directed beam operation; and said collimator means being removable for providing diffused beam operation.

In a second aspect, the present invention provides a transceiver for providing a wireless communication interface for a computer, said transceiver comprising; a housing; a substrate for receiving a plurality of light emitting diodes, said substrate being mounted inside said housing and including external electrical connection means for connecting to the computer; aperture means in said housing for passing light beams emitted by said light emitting diodes; collimator means for redirecting beams emitted from said light emitting diodes into parallel beams for directed beam operation, said collimator means being removable for providing diffused beam operation; and adjusting means cooperative with said housing for changing the orientation of said housing and thereby the direction of the beams emitted by said light emitting diodes.

BRIEF DESCRIPTION OF THE DRAWINGS

Reference will now be made, by way of example, to the accompanying drawings which show a preferred embodiment of the present invention, and in which.

DETAILED DESCRIPTION OF THE PREFERRED EMBODIMENTS

Figure 1:
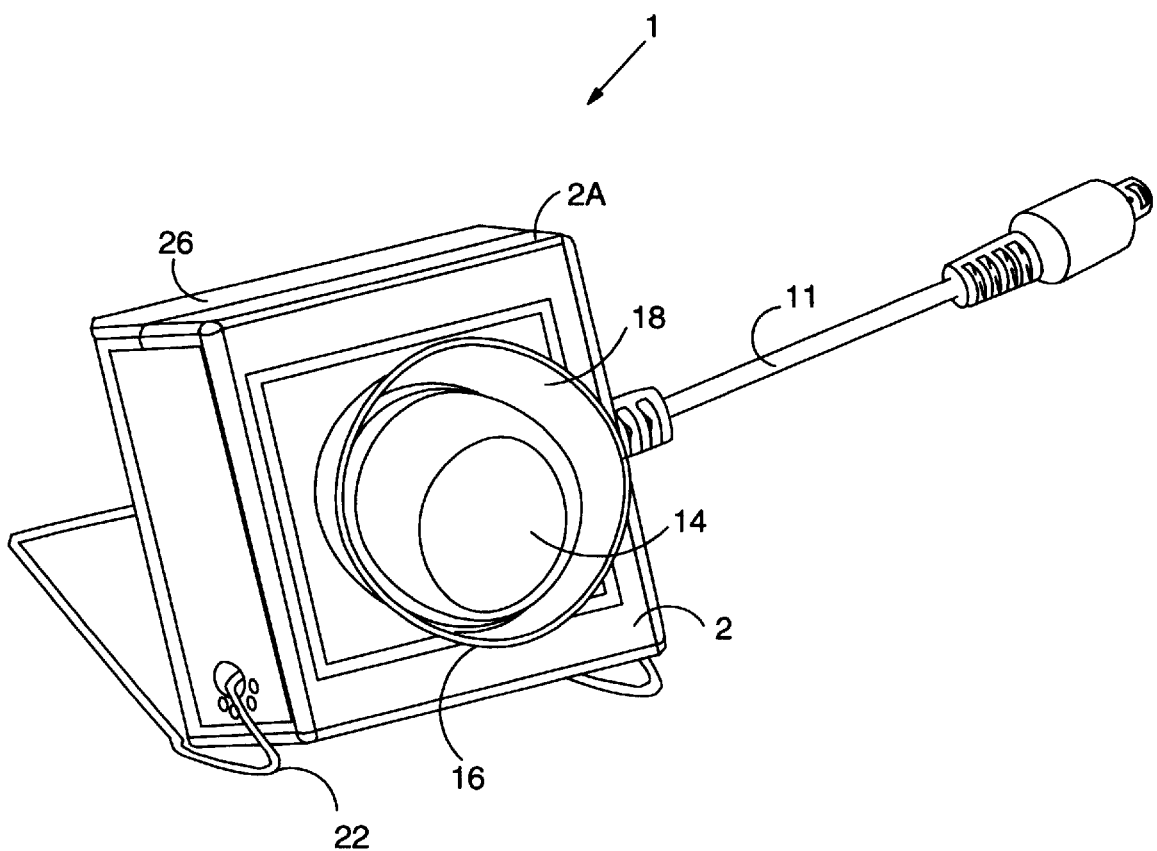
FIG. 1 is a perspective view of an infrared transceiver according to the present invention.

Reference is first made to FIG. 1 which shows a convertible transceiver according to the present invention and indicated generally by 1. In the figures, like numerals indicate like elements.

The transceiver 1 comprises a housing 2. The housing 2 is constructed using conventional methods, for example, the housing 2 may be formed from plastic as two halves 2a, 2b which snap-fit together.

Figure 4:
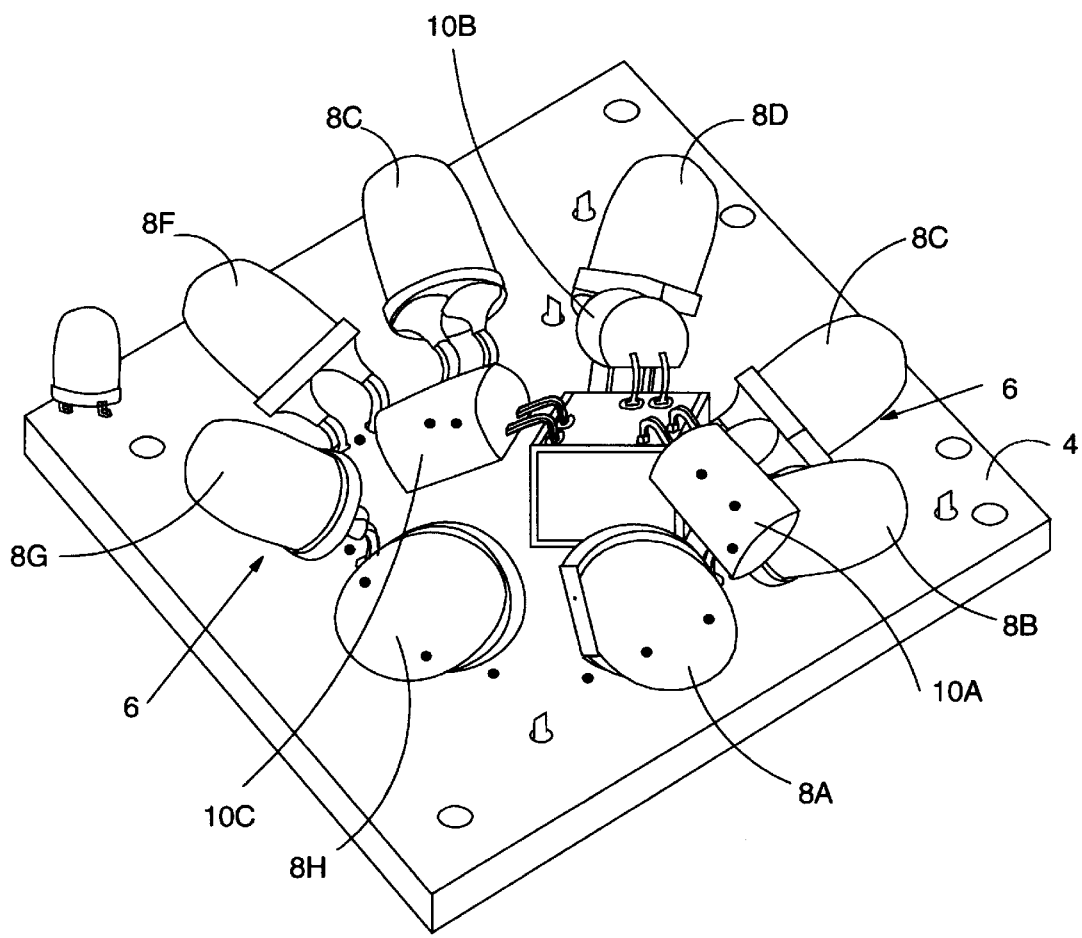
FIG. 4 is a perspective view of an electro-optical assembly for the transceiver according to the present invention.

The housing 2 holds a substrate 4 (FIGS. 4 and 5), for example, a printed circuit board or other suitable carrier. An electro-optical assembly is mounted on the substrate 4, and for an infrared transceiver 1, the electro-optical assembly includes an array 6 of infrared light emitting diodes (LEDs), and one or more photodiodes. To provide an optimal dispersion pattern, the array 6 preferably comprises eight light emitting diodes, shown individually as 8a, 8b to 8h in FIG. 4, mounted in a circular arrangement on the substrate and oriented at angle of approximately 25° from horizontal, i.e. 25° from the plane of the substrate 4. Three photodiodes, shown individually as 10a, 10b and 10c in FIG. 4, are also mounted on the substrate 4. The orientation of the photodiodes 10 is selected to optimize reception of incoming beams as will be within the knowledge of those skilled in the art. The transceiver 1 includes an external electrical connector 11 which couples the electro-optical assembly, i.e. light emitting diode array 6 and photodiodes 10, to a computer or data processing station (not shown) in the LAN.

Figure 5:
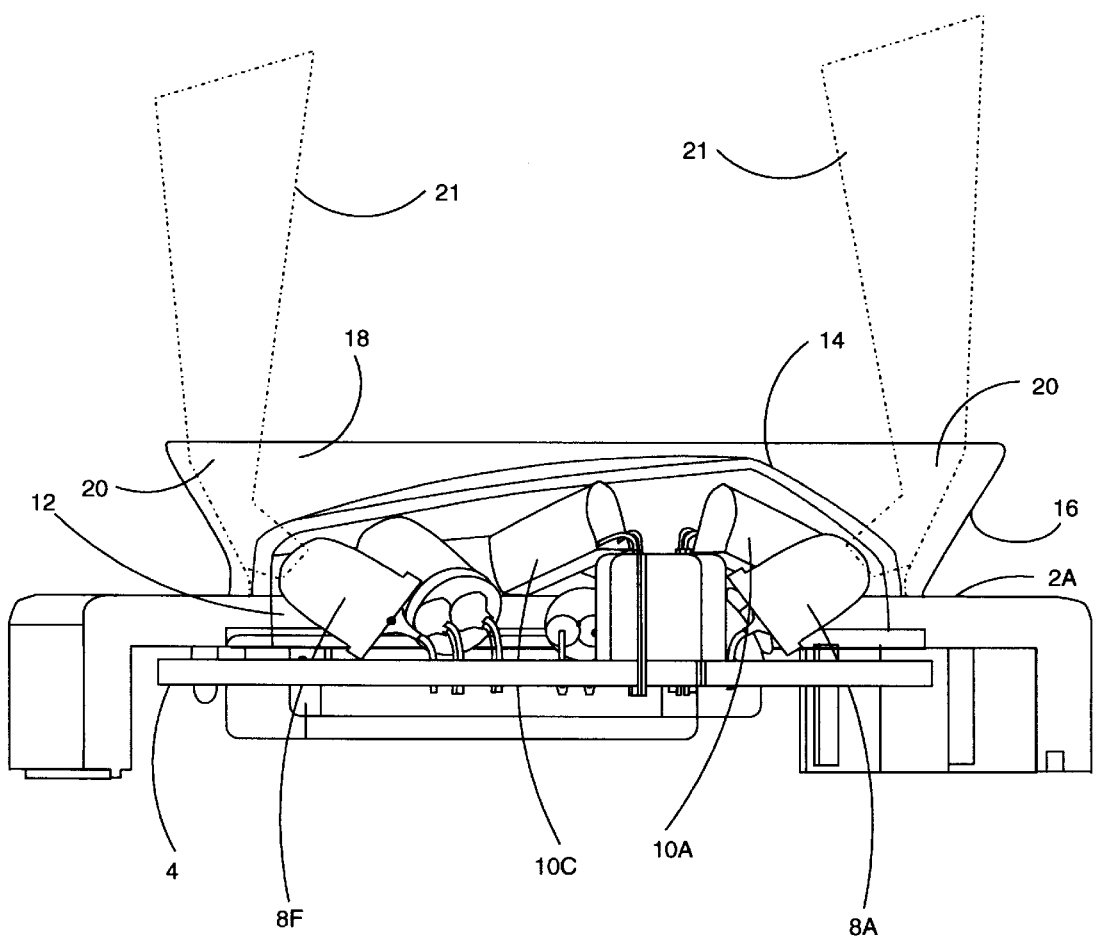
FIG. 5 is a sectional view of the transceiver taken through line A—A in FIG. 2.

As shown in FIG. 5, the housing 2 has an aperture 12 for passing beams from the light emitting diodes 8 and beams to the photodiodes 10. The housing 2 also includes a cover member 14 which covers the aperture 12 and the light emitting diodes 8 and photodiodes 10. The cover member 14 is formed from a material which is transparent to infrared radiation, for example, a Lexan (trade mark of General Electric) material. The cover member 14 may be formed to incorporate optical features to aid in the transmission and/or focusing of the beams.

The transceiver 1 according to the present invention features a collimator 16. The columnator 16 attaches to the face of the housing 2 around the aperture 12. The collimator 16 has an inside surface 18 which is coated with a reflective material suitable for reflecting infrared light beams. In FIG. 5, the light emitting diodes 8 emit beams 20 (shown in broken outline) at approximately 25° from horizontal and the inside surface 18 of the collimator 16 is formed at an angle which produces reflected beams 21 which are at approximately right angles.

It is a feature of the present invention that the collimator 16 is user installable. The housing 2 includes suitable mounting means for example a "bayonet" type mount for attaching and detaching the collimator 16. Without the columnator 16 installed, the beams emitted by the light emitting diodes spread outwardly at angle of approximately 25° to the horizontal (i.e. plane of the substrate 4) and allow the working environment, e.g. office space, to be filled with infrared beams. When the collimator 16 is installed, the beams 20 (FIG. 5) are deflected and redirected in parallel beams 21 which are approximately at right angles as shown in FIG. 5.

Figure 2:
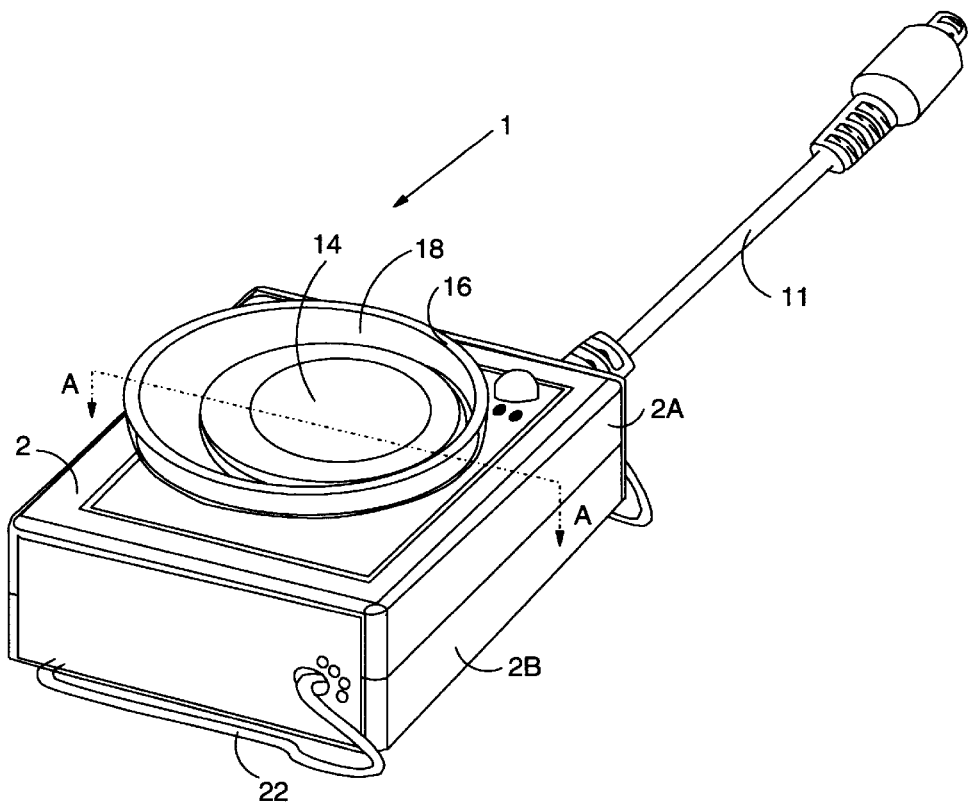
FIG. 2 is a perspective view of the infrared transceiver of FIG. 1 in a down position.
Figure 3:
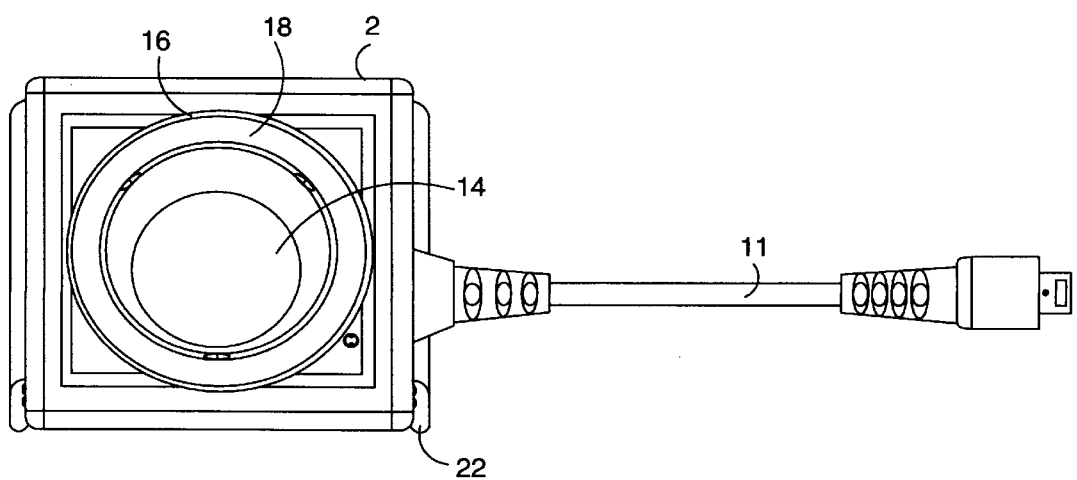
FIG. 3 is a top view of the transceiver of FIG. 2 in the down position.

To provide a means of directing the beams emitted by the light emitting diodes 8, the transceiver 1 includes a tilt stand 22. The tilt stand 22 attaches to the base of the housing 2 and allows the transceiver 1 to be placed in an upright position on a flat surface, for example, the top of a desk or on a shelf. The tilt stand 22 is adjustable allowing the housing 2 to be tilted at a variety of angles from flat (i.e. down), as shown in FIGS. 2 and 3, to upright as shown in FIG. 1. The adjustability provided by the tilt stand 22 allows the parallel beams 21 to be pointed in a predetermined direction in a "point and shoot" transmission configuration. The tilt stand 22 also provides adjustability for optimizing the spread of the beams in a diffused transmission, i.e. without the collimator 16 installed.

The present invention may be embodied in other specific forms without departing from the spirit or essential characteristics thereof. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A convertible transceiver for providing a wireless communication interface for a computer, said convertible transceiver comprising;

a housing having an aperture;

a substrate for receiving a plurality of light emitting diodes, said substrate being mounted inside said housing such that light beams emitted by said light emitting diodes pass through the aperture;

an external electrical connection for providing electrical signals to said light emitting diodes for wireless communication transmission;

a mounting means;

a collimator for redirecting beams emitted from said light emitting diodes into parallel beams for directed beam operation, said collimator removable mounted to said housing by the mounting means, the transceiver providing diffused beam operation when the collimator is removed.

2. The transceiver as claimed in claim 1, further including an adjusting means cooperative with said housing for changing the orientation of said housing and thereby the direction of the beams emitted by said light emitting diodes.

3. The transceiver as claimed in claim 2, wherein said collimator has a reflective surface arranged to deflect beams emitted from said light emitting diodes at approximately right angles in relation to said substrate.

4. The transceiver as claimed in claim 3, wherein said reflective surface is coated with a material suitable for reflecting infrared light beams.

5. The transceiver as claimed in claim 2, wherein said adjusting means comprises a tilt stand connected to said housing.

6. The transceiver as claimed in claim 2, further including:

a cover member which covers the aperture, said cover member being transparent to said light beams.

7. The transceiver as claimed in claim 6, wherein said cover member includes optical features for enhancing the transmission of said light beams.

8. The transceiver as claimed in claim 1, wherein said collimator comprises a deflector ring.

9. The convertible transceiver of claim 1 wherein the plurality of light emitting diodes are mounted on said substrate so that the beams emitted by the light emitting diodes spread outwardly at an angle of approximately 25° relative to the plane of the substrate.

10. The convertible transceiver of claim 1 wherein the beams from the light emitting diodes are spread outwardly at an angle of approximately 25° relative to the plane of the substrate for diffused mode operation and are emitted at approximately right angles relative to the plane of the substrate for directed mode operation.

11. A convertible transceiver for providing a wireless communication interface for a computer, said transceiver comprising;

a housing having an aperture;

a substrate for receiving a plurality of light emitting diodes and one or more photodiodes, said substrate being mounted inside said housing such that light beams emitted by said light emitting diodes pass through the aperture;

an external electrical connection coupled to the substrate for providing electrical signals to said light emitting diodes for wireless communication, transmission and for obtaining electrical signals from said photodiodes for wireless communication reception;

a collimator for redirecting beams emitted from said light emitting diodes into parallel beams for directed beam operation, said collimator being removable for providing diffused beam operation; and an adjusting means cooperative with said housing for changing the orientation of said housing and thereby the direction of the beams emitted by said light emitting diodes.

12. The transceiver as claimed in claim 11, wherein said light emitting diodes are arranged in a circular array on said substrate and oriented at an angle of approximately 25° from the plane of said substrate.

13. The transceiver as claimed in claim 12, wherein said collimator has a reflective surface arranged to deflect beams emitted from said light emitting diodes at approximately right angles in relation to said housing.

14. The transceiver as claimed in claim 13, wherein said collimator comprises a deflector ring and said housing includes mounting means for detachably mounting said deflector ring.

15. The transceiver of claim 11 wherein the plurality of light emitting diodes are mounted on said substrate so that the beams emitted by the light emitting diodes spread outwardly at an angle of approximately 25° relative to the plane of the substrate.

16. The transceiver of claim 11 wherein the beams from the light emitting diodes are spread outwardly at an angle of approximately 25° relative to the plane of the substrate for diffused mode operation and are emitted at approximately right angles relative to the plane of the substrate for directed mode operation.

* * * * *